Patented Feb. 13, 1940

2,190,177

UNITED STATES PATENT OFFICE 2,190,177

MANUFACTURE OF SULPHUR NITRIDE

Carl F. Swinehart, Cleveland Heights, Ohio, assignor to The Harshaw Chemical Company, Elyria, Ohio, a corporation of Ohio No Drawing. Application April 1, 1938,
Serial No. 199,503

14 Claims. (Cl. 23—191)

This invention relates to a process for preparation of sulphur nitride and has for its principal object to provide a cheap and effective process for reacting together sulphur chloride and ammonia to form sulphur nitride, sulphur and ammonium chloride.

A further object of the invention is to produce a mixture of sulphur and sulphur nitride in finely divided, light powder form, and to produce useful mixtures containing such powder.

The desired reaction, indicating only the final condition and neglecting the intermediate stages, is as follows:

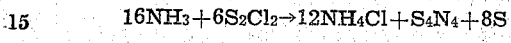

$$16NH_3 + 6S_2Cl_2 \rightarrow 12NH_4Cl + S_4N_4 + 8S$$

My novel process, broadly stated, consists in dispersing sulphur chloride on solid material and aerating the resulting mixture in an atmosphere containing ammonia. By atmosphere I mean gaseous environment and by aerating I mean any manipulation adapted to improve the contact between the solid material and its atmosphere, e. g., tumbling.

In practice, I add sulphur chloride to an inert solid material (i. e., inert to the reactants) in more or less finely divided state and aerate the resulting mixture in an atmosphere containing or consisting of gaseous ammonia, either at atmospheric pressure or at a higher pressure. The inert solid material may be, for example, NaCl or dry, powdered bentonite or talc, but preferably is $NH_4Cl$, since that is one of the products of the reaction and, for that reason, lends itself readily to recycling without building up a mixture.

Whatever the solid carrier employed, it is mixed in suitable proportion with sulphur chloride and is present in sufficient quantity to absorb the heat of reaction to an extent to prevent undue rise in temperature. The richer the atmosphere in $NH_3$, the smaller should be the proportion of sulphur chloride with respect to the inert solid. It is believed that maintaining fairly low temperature at the points of reaction has an important effect on the constitution of the final product.

Example I 150 parts by weight $S_2Cl_2$ were mixed with 500 parts by weight of $NH_4Cl$ in crystalline form and in a state of subdivision between 40 mesh and 60 mesh. The mixture was tumbled, in a water cooled tumbling barrel, in an atmosphere of gaseous $NH_3$, until the mass appeared dry and had assumed first a violet, then a reddish or orange and finally a yellow color. The $NH_3$ was admitted at a rate to produce the yellow color in about two hours and to hold the temperature of the mass below 50° C. The solids were then leached with water, whereupon the final product was obtained in the form of a finely divided, yellow powder, being principally a dispersion of $S_4N_4$ on sulphur. The product analyzed 24½% $S_4N_4$ and the balance substantially pure sulphur, as against a theoretical 42% $S_4N_4$ and 58% S for a mixture of one molecule $S_4N_4$ and 8 molecules sulphur.

The time consumed was, in this case, about two hours, but the time varies according to the amount of material being tumbled, the size of the tumbling barrel, the rate of tumbling, the temperature, pressure physical state and proportion of inert solid, rate of ammonia feed and other factors, none of which are sharply critical. The end point, however, can be readily determined from the appearance of the mass. At the beginning it has the appearance of a moist powder, not a slurry, but intermediate between a slurry and a dry powder, having some lumps, which, however, crumble readily upon tumbling. As the reaction progresses, the mass becomes dry and powdery and assumes first a violet, then a reddish or orange color and finally changes to yellow as the reaction becomes complete. Aside from the matter of cost, there is no objection to continuing the tumbling operation beyond the time required to complete the reaction.

For some uses, it is quite feasible to leave the $NH_4Cl$ in the product. For example, for a powder insecticide, the product may be ground to reduce the $NH_4Cl$ crystals to a powder, or the whole product may be ground with bentonite, talc or the like in quantity to produce the desired strength. Likewise, the $S_2Cl_2$ carrier may be a powdered material such as clay, talc or the like and the reaction product used without any processing or after leaching out the $NH_4Cl$ produced in the reaction.

Example II

Ten parts of $S_2Cl_2$ were absorbed on 100 parts of air-dried bentonite and the mixture was tumbled in an atmosphere of $NH_3$ in a water-cooled tumbling device. $NH_3$ was admitted at a rate to complete the reaction in two hours and to hold the temperature of the mass below 50° C. Upon analysis, the product showed practically a theoretical yield. Upon varying the procedure by using twice as much $S_2Cl_2$, a lower yield was obtained.

Example III 20 parts of $S_2Cl_2$ were absorbed on 100 grams of powdered bentonite, and the mixture, still an apparently dry powder, was allowed to drop through a column in which the air had been displaced by ammonia. The intermediate color changes of Example I were not perceptible, the final color appearing immediately, but the product obtained by analysis was about 3% $S_4N_4$ as against a calculated 3.8%. The temperature in the column may be permitted to go to 60° C. or even higher, but best yields of $S_4N_4$ are had below 50° C.

Having thus described my invention, what I claim is:

1. Process of producing sulphur nitride comprising dispersing a quantity of sulphur chloride on more than its own weight of inert solid material and subjecting the resulting material to gaseous $NH_3$ in such low concentration, and at such a temperature as largely to suppress the formation of end products other than $NH_4Cl$, $S_4N_4$ and sulphur and until the reaction mixture has assumed a characteristic, stable, color indicating that the end point has been reached.

2. Process of producing sulphur nitride comprising dispersing a quantity of sulphur chloride on more than its own weight of inert solid material and aerating the resulting material in an atmosphere containing $NH_3$, the proportion of $S_2Cl_2$ with respect to the solid material, the concentration of $NH_3$ in the atmosphere of $NH_3$ and the temperature being adjusted with respect to each other to values low enough to prevent any considerable formation of end products other than $NH_4Cl$, $S_4N_4$ and sulphur, the aeration being continued until a characteristic, stable color appears indicating that the end point has been reached.

3. Process of producing sulphur nitride with $S_4N_4$, $NH_4Cl$ and S as the only end products produced in substantial amounts comprising dispersing a quantity of sulphur chloride on more than its own weight of inert solid material and treating the resulting material with $NH_3$ at a rate to maintain the temperature of the mass at a point not greatly exceeding 60° C.

4. Process of producing sulphur nitride comprising dispersing a quantity of sulphur chloride on more than its own weight of solid, pulverulent material and subjecting the resulting mixture to an atmosphere containing $NH_3$, the admission of $NH_3$ being regulated to retard reaction sufficiently and to maintain the temperature sufficiently low to suppress formation of end products other than $NH_4Cl$, $S_4N_4$ and sulphur in substantial amounts.

5. Process of producing sulphur nitride with $S_4N_4$, $NH_4Cl$ and S as the only end products produced in substantial amounts comprising dispersing sulphur chloride on several times its own weight of inert, solid material and aerating the resulting mixture in a weak atmosphere of $NH_3$ until the reaction has been completed, the concentration of ammonia being such as to maintain the temperature below 60° C.

6. Process of producing sulphur nitride with $S_4N_4$, $NH_4Cl$ and S as the only end products produced in substantial amounts comprising mixing $S_2Cl_2$ with at least 5 times its weight of finely divided, inert, solid material and subjecting the resulting mixture to an atmosphere of $NH_3$ at a temperature not substantially higher than 60° C.

7. A process of producing sulphur nitride comprising dispersing a quantity of sulphur chloride on more than its own weight of inert solid material and subjecting the so treated material to gaseous $NH_3$ at a rate and at a temperature low enough to convert substantially all the sulphur chloride to $S_4N_4$, $NH_4Cl$ and S without formation of substantial quantities of other end products.

8. A process of producing sulphur nitride comprising dispersing a quantity of $S_2Cl_2$ on the surface of the particles of a mass greater than its own of solid $NH_4Cl$ and aerating the mixture in an atmosphere containing $NH_3$, and at a temperature and concentration of $NH_3$ such as to convert substantially all the sulphur chloride to $S_4N_4$, $NH_4Cl$ and S without formation of substantial quantities of other end products.

9. A process of producing sulphur nitride comprising dispersing a quantity of $S_2Cl_2$ on the surface of the particles of a mass greater than its own of powdered argillaceous material and aerating the mixture in an atmosphere containing $NH_3$, and at a temperature and concentration of $NH_3$ such as to convert substantially all the sulphur chloride to $S_4N_4$, $NH_4Cl$ and S without formation of substantial quantities of other end products.

10. Process of producing sulphur nitride comprising dispersing a quantity of $S_2Cl_2$ on at least twice its weight of inert, pulverulent solid material and treating the resulting material with $NH_3$ at a rate to maintain the temperature of the mass below 50° C. until the final, stable, yellow color appears.

11. The process of producing sulphur nitride recited in claim 10, characterized in that the said pulverulent material is $NH_4Cl$.

12. Process of producing sulphur nitride comprising dispersing $S_2Cl_2$ on more than five times its weight of dry powdered bentonite, aerating the mixture in an atmosphere containing $NH_3$ gas, while maintaining the temperature below 50° C.

13. Process comprising dispersing $S_2Cl_2$ on at least twice its weight of inert pulverulent solid material and reacting the resulting material with gaseous $NH_3$ at a rate to maintain the temperature of the mass below 50° C. and until the $S_2Cl_2$ is substantially completely converted to $NH_4Cl$, $S_4N_4$, and S.

14. Process comprising dispersing $S_2Cl_2$ on at least twice its weight of inert pulverulent solid material and reacting the resulting material with gaseous $NH_3$ at a rate to maintain the temperature of the mass below 60° C. and until the $S_2Cl_2$ is substantially completely converted to $NH_4Cl$, $S_4N_4$, and S.

CARL F. SWINEHART.